United States Patent [19]
Brady et al.

[11] Patent Number: 5,563,583
[45] Date of Patent: Oct. 8, 1996

[54] MULTIBIT MAGNETIC RADIO FREQUENCY TAG USING MICROMECHANICS

[75] Inventors: Michael J. Brady, Brewster; Praveen Chaudhari, Briarcliff Manor; Richard J. Gambino, Stony Brook; Harley K. Heinrich, Brewster; Paul A. Moskowitz, Yorktown; Alejandro G. Schrott; Robert J. von Gutfeld, both of New York, all of N.Y.

[73] Assignee: International Business Machines Corporation, Armonk, N.Y.

[21] Appl. No.: 344,805

[22] Filed: Nov. 23, 1994

[51] Int. Cl.⁶ .................................................. G08B 13/14
[52] U.S. Cl. ........................ 340/572; 340/568; 340/551
[58] Field of Search ................................. 340/572, 551, 340/568

[56] References Cited

U.S. PATENT DOCUMENTS

| | | | |
|---|---|---|---|
| 4,484,184 | 11/1984 | Gregor et al. | 340/572 |
| 4,510,489 | 4/1985 | Anderson, III et al. | 340/572 |
| 4,510,490 | 4/1985 | Anderson, III et al. | 340/572 |
| 4,568,921 | 2/1986 | Pokalsky | 340/572 |
| 4,779,076 | 10/1988 | Weaver | 340/551 |
| 4,940,966 | 7/1990 | Pettigrew et al. | 340/572 |
| 5,001,458 | 3/1991 | Tyrén et al. | 340/572 |
| 5,001,933 | 3/1991 | Brand | 340/572 |
| 5,175,419 | 12/1992 | Yamashita | 340/551 |
| 5,204,526 | 4/1993 | Yamashita et al. | 340/551 |

OTHER PUBLICATIONS

Wilfinger et al.; "Speech Coder Utilizing Semiconductor Cantilevers"; IBM Technical Disclosure Bulletin, vol. 10, No. 8, Jan. 1968; p. 1259.

*Primary Examiner*—Brent A. Swarthout
*Assistant Examiner*—Benjamin C. Lee
*Attorney, Agent, or Firm*—Whitham, Curtis, Whitham & McGinn; Stephen S. Strunck, Esq.

[57] ABSTRACT

A radio frequency (RF) multibit tag structure useful for identifying objects of interest is described. An array of thin cantilevers of slightly different lengths produced by differential etching are coated with a soft magnetic material which upon interrogation with an RF magnetic field vibrate at their resonant frequencies in the presence of an appropriate bias or direct current (DC) field. The oscillating magnetic fields generated by the vibrating bars and the stationary DC field can be readily detected by a receiver and processed to determine the code of the tag and thus provide information related to the object.

19 Claims, 2 Drawing Sheets

MULTIBIT MAGNETIC RADIO FREQUENCY TAG USING MICROMECHANICS

BACKGROUND OF THE INVENTION

1. Field of the Invention

The present invention generally relates to identification tag structures for attaching to an article of interest, and more specifically to radio frequency (RF) magnetic tag structures having portions (e.g., arms) coated with thin magnetic films and utilizing resonant frequencies of the arms for identification of the article.

2. Cross-reference to Related Applications

The invention disclosed and claimed herein is related to the inventions disclosed and claimed in copending applications Ser. Nos 08/344,808, 08/344,296 and 08/344,196.

3. Description of the Related Art

For personnel identification, retail tagging, tagging used in the road/air-freight package industry, and pallet tagging in manufacturing processes, a tag (also known as an "identification tag" or "marker") coupled to animate (e.g., personnel) or inanimate objects (hereafter referred to as "products" or "articles") is useful for identifying the personnel/product/article in detail. With a sufficient number of bits, the tag can be interrogated to determine what the product is (or who the person wearing the tag is), when it was manufactured, its price, whether the product has been properly passed through an interrogation zone (e.g., a check-out counter or a kiosk) etc. Identifying the product via a tag may hasten a new type of checkout system for the retail industry giving rise to a so-called "no-wait checkout".

Conventional magnetic tags and tag systems have had a number of problems including: 1) having only one bit, 2) requiring a large amount of power so as to read the tag, and 3) being relatively easy to defeat by tampering.

For example, a first conventional tag element includes a single longitudinally resonant element, whereas a second conventional tag element includes a plurality of resonant elements. Each of these tags uses soft magnetostrictive material on a substrate, biased by an adjacent strip of a hard magnetic material. Magnetic fields stimulated by an alternating current (AC) field causes rotation of domains resulting in a change in the strip's permeability. This change in permeability can give rise to a resonant magnetomechanical coupling and results in a dimensionally changed and enhanced magnetic flux change which is detected by a receiving coil. Deactivation of the tag is accomplished by using an additional bias magnet located externally to the tag to change the field of the fixed magnet within the tag, thereby resulting in a change in the strip's resonant frequency so that the resonant frequency falls outside of a preset detectable frequency.

The conventional tags above do not employ cantilevers. Further, these conventional tags employ magnetostrictive materials (e.g., materials in which their dimensions change due to magnetization thereof) and utilize only magnetic excitation. Each of the conventional tags above utilizes resonant frequencies, which, because they result in longitudinal rather than transverse resonances, are proportional to the reciprocal length of the magnetostrictive strip.

A third conventional tag has a vibration sensor having one or more cantilevers tuned to resonate at predetermined frequencies. The cantilever vibration causes a circuit gap to close, thereby allowing current to flow through the cantilever and the then-closed contact, with the current then flowing to a microchip and an integrated circuit mounted on the base of the device.

This tag is disadvantageous because it requires a power source, wiring, current flow through the device for sensing and an integrated circuit, all of which are part of the package and thereby make the device large and complex. Excitation is via mechanical vibration.

Yet another conventional tag system includes several different lengths of magnetostrictive material which are made to resonate in a longitudinal mode upon magnetic AC excitation being applied thereto. The resonant frequency is proportional to 1/length as opposed to $1/(length)^2$ for cantilevers. Because the material is magnetostrictive, a rotation of domains upon application of an external, heterogeneous bias field will cause a change in the Young's modulus of the magnetostrictive material, thereby resulting in a shift in resonance frequencies. As is known, the Young's modulus is dependent on the applied magnetic bias field. The change in Young's modulus in an applied field is commonly referred to as "the $\Delta E$ effect". The shift in frequency is sensed upon application of an alternating current (AC) resonant magnetic field in combination with the direct current (DC) field. For an externally applied heterogeneous bias field, more than one tag can be detected even if otherwise identical, so long as each tag is located spatially apart from one another.

A fourth conventional device includes cantilevers having different lengths, responding to different frequencies resulting from speech patterns. The device uses neither magnetic materials nor magnetic excitation or detection. Instead, piezoelectric sensors are incorporated onto the cantilever structure for sensing speech, thus requiring wiring. Further, there is no ability of this device to be sensed remotely.

In view of the foregoing, hitherto the invention, there has not been any tag or tag system having more than one bit, which can be read with relatively low power density (e.g., preferably on the order of $\approx 0.1 mW/cm^2$) and sensed remotely, and which is difficult to defeat by tampering.

SUMMARY OF THE INVENTION

It is therefore an object of the present invention m provide a tag and tag system having more than one bit, which can be read with relatively low power density (e.g., preferably on the order of $\approx 0.1 \ mW/cm^2$) and sensed remotely (e.g., by a device external to the tag), and which is difficult to defeat by tampering.

In a first aspect of the invention, an RF tag is provided according to the present invention which is fabricated from a predetermined material (e.g., preferably silicon) having portions coated with thin magnetic films and utilizing resonant frequencies of thin bars or cantilevers having slightly different lengths produced by differential etching or the like. An array of such bars is preferably coated with a magnetic material which, upon interrogation with an RF (AC) magnetic field, will vibrate at the bars' resonant frequencies in the presence of a predetermined bias or direct current (DC) field. Here, the force needed for vibration is created by the field gradient. A set of harmonic RF frequencies will be generated from the different lengths of the one-end clamped bars. The fields produced by the interaction of the oscillating (RF) magnetic field generated by the vibrating bar and the stationary DC field can be readily detected by a receiver.

In a second aspect of the invention, a unique and unobvious RF tag structure for coupling to an article and for being interrogated to give information regarding the article, is provided which includes a substrate, and a plurality of arms coupled to the substrate, each of the plurality of arms being coated with a magnetic coating and at least some of the plurality of arms being set to have a predetermined frequency upon being subjected to excitation. The invention also includes means for magnetically biasing the plurality of arms, wherein, upon reception of external excitation, at least some of the plurality of arms generate harmonic magnetic oscillations defining a predetermined code, the excitation being at least one of acoustic excitation or magnetic excitation.

BRIEF DESCRIPTION OF THE DRAWINGS

The foregoing and other objects, aspects and advantages will be better understood from the following detailed description of a preferred embodiment of the invention with reference to the drawings, in which.

DETAILED DESCRIPTION OF A PREFERRED EMBODIMENT OF THE INVENTION

Figure 1A:
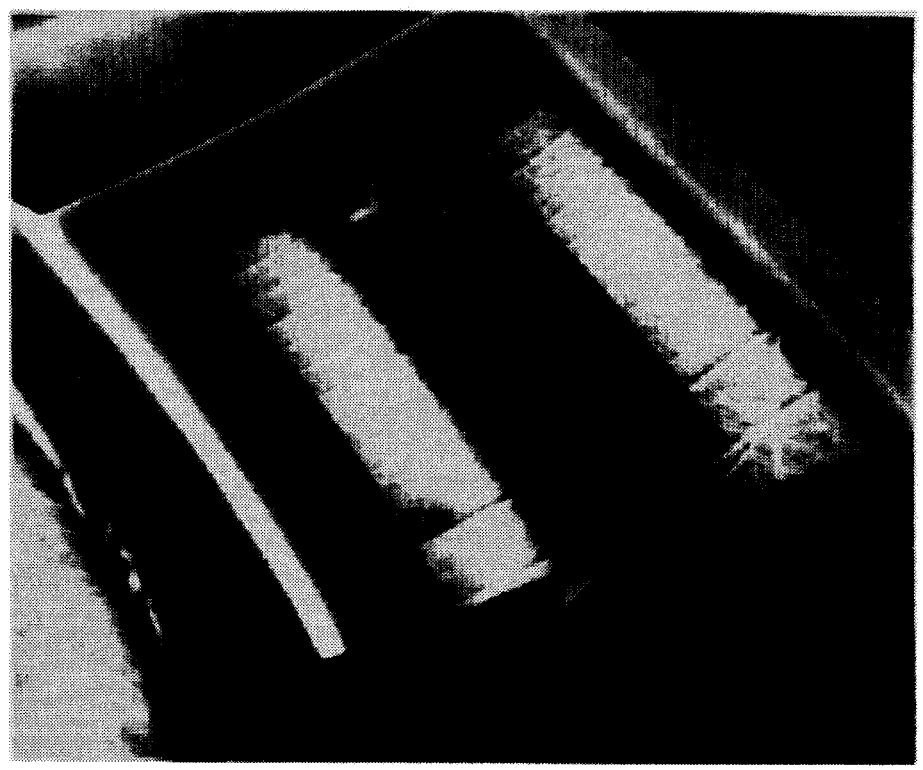
FIG. 1A illustrates selective silicon etching techniques for forming a plurality of cantilevers (or bars) clamped at one end using a silicon wafer as a starting material, according to the present invention.

Referring now to the drawings, and more particularly to FIG. 1A, the invention generally includes an array of arms (e.g., cantilevers or bars) produced by micromachining or selective etching techniques as are known in the art. Micromachining is the technology whereby mechanical devices are fabricated using techniques employed in the fabrication of monolithic integrated circuits. FIG. 1A illustrates the selective silicon etching technique in forming the plurality of arms.

The plurality of arms are mechanically clamped at one end by the wafer itself, the arms preferably formed from silicon or the like, as the starting material. Silicon is preferably used since it can be anisotropically etched by prescribed reagents. The arms can be integrally formed with the substrate or can be separately formed from the substrate and then mounted thereto with one end of the arms being clamped to the wafer. Alternatively or additionally to silicon, other suitable starting materials can also be used, such as, for example, any etchable material (e.g., Ge, Mo, W, etc.)

For silicon, lithographic techniques, as known in the art, are employed to produce a selective boron implant in a predetermined shape (e.g., the shape of small rectangles) on the surface of the silicon. Clearly, the boron implant can take any desired shape depending upon desired design characteristics and parameters. The boron acts as a mask stop for the subsequent silicon etching step. In addition to or in lieu of boron, other suitable mask materials can be used as are known in the art.

Figure 1B:
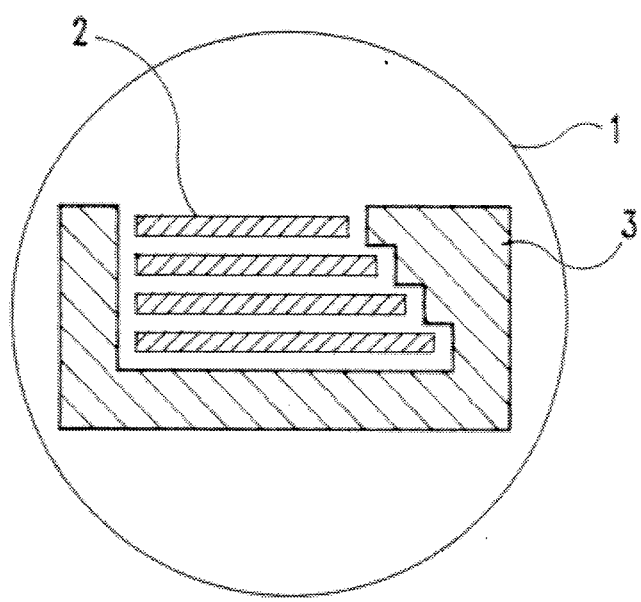
FIG. 1B illustrates the structure of the tag according to the present invention.

The structure of the present invention is more clearly shown in FIG. 1B in which the tag (also known as an identifier, marker or the like) is formed by first providing a substrate 1 such as a silicon wafer or the like. The substrate is selectively etched to produce an array of micromechanical arms (cantilevers, bars, etc.) 2 having one end fixed to said substrate and being free to vibrate upon excitement by a suitable excitation means (e.g., sound wave producing device, a magnetic field producing device, etc.).

A bias field to the arms 2 is provided by permanent magnet yoke 3. The arms are "interrogated" as discussed below by introduction of a predetermined set of radio frequency (RF) fields which causes the cantilevers to resonate at a predetermined frequency, thereby sending a signal to a receiving coil (and ultimately to a processor) to determine the code of the tag (and thus identify information related to the article). As discussed below, each arm can be used to provide a bit of data through its unique resonant frequency or harmonics thereof. In lieu of or in addition to the yoke configuration, an inhomogeneous external field can be used for biasing the arms/cantilevers.

Thus, with the present invention, a plurality of cantilevers having varying lengths and/or thicknesses is produced, each cantilever resonating at a given fixed fundamental frequency given by $$f_1 = (0.16 T/L^2)(Y/\rho)^{0.5} \tag{1}$$

wherein:

$f_1$ is frequency of vibration of the fundamental mode of vibration;

$Y$ is Young's modulus;

$\rho$ is the density of the cantilever material;

$L$ is the length of the cantilever; and $T$ is the thickness of the cantilever.

The higher normal mode frequencies are given by:

$$f_2 = 6.27 f_1; \text{ and}$$

$$f_3 = 17.55 f_1.$$

From Equation 1, it is clear that for small changes in L, (i.e., $\Delta L$) that $\Delta f/f = -2\Delta L/L$. The factor two is advantageous in increasing the frequency spread, occurring because of the $1/L^2$ dependence of the frequency on the cantilever length.

Thus, upon exposure to, for example, a magnetic field within an interrogation zone, a substantial change in the effective magnetic permeability of the arms at the resonant frequency of which preselected frequencies are comprised, provide the marker with a signal identity. Hence, a predetermined exciting impulse signal generated by an exciting unit (e.g., a coil or the like such as AC or AC and DC coil, or speakers for acoustic applications) causes the strips to oscillate at their resonant frequencies, with these oscillations being easily detected by a receiver (e.g., a receiving coil or the like) and decoded by a decoding device.

Each cantilever 2 is coated with a thin layer of soft magnetic material to yield a low coercive ferromagnet with a high permeability. Materials which may be used for the thin layer include, for example, permalloy or other NiFe alloys, amorphous magnetic alloys and one or more alternating bi-layers of Ge and Co (or cobalt alloys) or Ge and Ni (or alloys of Ni). The cantilevers are preferably selectively formed to have predetermined resonant frequencies which are unique to one another.

As shown in FIG. 1B, the array is positioned in a permanent magnet of a highly coercive, highly remanent material in the form of a yoke 3 or two separated strips. This positioning in such a structure provides a bias or high DC field for the cantilevers 2. As mentioned above, in lieu of or in addition to the yoke configuration, an inhomogeneous external field for biasing the arms can also be employed.

To obtain the information on the tag and as mentioned above, an RF (or AC) interrogation field is applied thereto. Formation of an RF (or AC) interrogation field is believed to be well within the grasp of one of ordinary skill in the art within the purview of this application.

Many suitable methods of interrogating the tag are available. For example, an impulse signal can be used to cause all of the active elements (arms 2) to resonate simultaneously. The impulse is preferably directed at a power density of <1 mW/cm$^2$ and more preferably one the order of 0.1 mW/cm$^2$, but it is clear that any desired impulse power can be used by suitably modifying the design characteristics of the tag structure and the environment, the latter, for example, to maintain safety standards.

Another method of interrogating the tag is to apply a set of frequencies corresponding to the resonating frequencies in a "chirp" fashion to cause each active element present within the tag to vibrate in a temporal sequence. The frequencies can be applied by frequency generators coupled to the excitation device (e.g., speakers, AC excitation coil, and/or AC and DC excitation coil).

In any case, the interrogating signals cause the active elements to oscillate within the stronger bias field. The forces acting on the cantilevers 2 and the ensuing vibration are due to the additional magnetic field gradients caused by the introduction of the RF field.

Due to the magnitude of the displacement as well as to the nonlinearity caused by the hysteresis curve of the magnetic material coating the cantilever, RF harmonic (e.g., second) frequencies will be generated from each of the individual vibrating arms 2.

Then, the information or code from the tag can be sensed by detecting the presence or absence of the known (e.g., fundamental, second or higher) harmonic frequencies by a pickup or receiving coil. Such a coil is known in the art and will not be described herein in detail. Based on the detected frequency code (e.g., the harmonic waves of the frequency) generated by the tag, decoding or interpretation of the code can be accomplished by a suitable decoding device coupled to the pickup/receiving coil. The structure of the decoder is known in the art and thus will not be discussed here in detail except to say that the decoder typically includes, for example, an interface between the receiving apparatus (e.g., the coil or the like) and a suitable processor including such known circuitry as an analog-to-digital (A/D) converter, suitable signal condition/processing circuitry, lookup tables and logic circuitry.

The number of arms 2 in the array will determine the number of information bits possible to be stored to provide information regarding the article associated with the tag structure.

The large separation of the bars' harmonic frequencies may also be used by sensing higher harmonic frequencies with the detector or driving the cantilever at higher harmonic frequencies than the lowest order harmonic. For example, driving the cantilever at $f_2$ will cause a harmonic RF frequency to be generated at 2.54$f_2$. This multiplicative factor is especially useful when very small changes in bar length are desired, a condition that will contribute to miniaturization of the tag.

Furthermore, tags can be personalized or made to contain unique information by disabling certain predetermined arms. Then, the absence or presence of a frequency component will correspond to a "1"or "0"in real-time, as preselected by the operator. Numerous methods of personalizing the tag may be employed such that the bars are selectively disabled, including physically removing selected cantilevers or destroying the magnetization of selected cantilevers. One means, especially useful where the soft magnetic layer consists of bi-layers as earlier described is to heat the cantilevers to interdiffuse the layers thus causing the cantilevers to become non-magnetic so when diffused and, hence, no longer able to cause the silicon arm to vibrate with magnetic excitation.

The tag also can be interrogated using sound waves from speakers driven by frequency generators, or the like, to cause the individual cantilevers to be set into resonant transverse vibration. Changes in magnetic field due to the mechanical vibrations can be sensed by receiving/pickup coils or the like, as is known in the art. Similarly to the embodiment above, the presence or absence of a particular frequency serves as a "1" or "0" in binary logic. Based on the detected frequency (or detected frequency code) generated by the tag, decoding or interpretation of the code can be accomplished by a suitable decoding device coupled to the pickup/receiving coil as discussed above.

An advantage of interrogating by an audio signal is that the need for special orientations to couple the interrogation signal to the device is less critical. Detection can be readily achieved by arranging sensing coils along various orientations. Magnetic sensing from various orientations is much simpler than interrogating multidirectionally. The output of the pickup/receiving coils are preferably input to a detecting/decoding element in which a signal level above a predetermined threshold will cause an alarm or the like to be generated by the detecting/decoding element.

For magnetic excitation, the cantilevers 2 are preferably encased in a vacuum housing to avoid damping by air resistance. Damping makes detection of the resonant frequencies more difficult. By the same token, if damping is desired, the cantilevers can be encased in a suitable gaseous environment. Since the cantilevers 2 are clamped at one end, the casing can be designed to allow mechanical coupling from the outside portion of the casing to each cantilever, in which case acoustic excitation can be employed.

As mentioned above, the tag according to the present invention is typically used in a system for identifying an article to which the tag is coupled, with the system using acoustic and/or magnetic excitation to interrogate the tag.

Figure 2A:
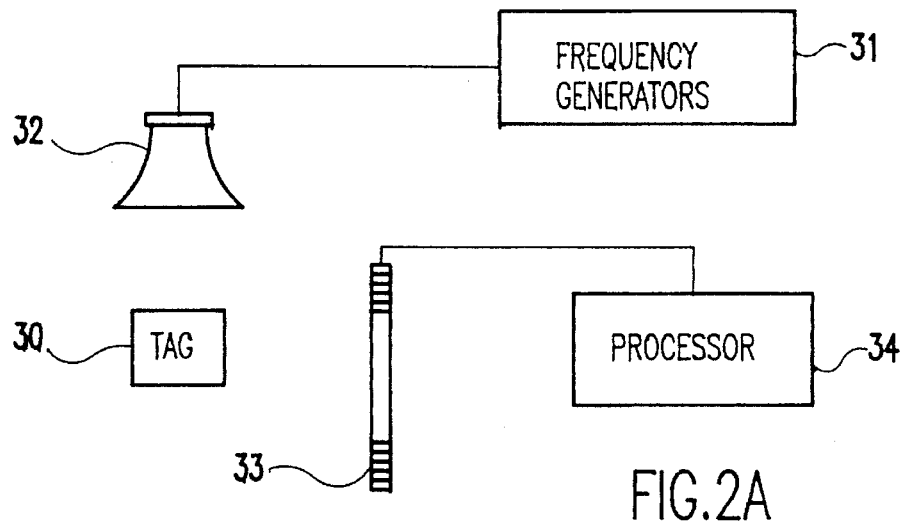
FIG. 2A illustrates an acoustically-driven tag according to the present invention.

In a first example of such a system, FIG. 2A illustrates an acoustically-driven tag according to the present invention in which a tag 30 has acoustical waves applied thereto by a plurality of frequency generators 31 coupled to speakers 32. The number of frequencies used will correspond to the number of elements on the tag (and thus correspond to the number of bits). As a result of receiving the acoustical excitation, the tag's active elements (cantilevers) will begin to oscillate at their resonant frequencies. The resonant frequencies will be received and sensed by a sensor/pickup coil 33. Coil 33 generates a signal based on the input from the tag 30, with the corresponding signal being processed by well-known circuitry in (or coupled to) a processor 34 to thereby detect a predetermined code on the tag 30. As is known, the processor can be coupled to an alarm device should the code match (or not match) other preselected information. Other features of this system include the capability of optimized interrogation by deploying a variety of speakers in different directions to minimize orientation or shadowing effects. This system is advantageous because special orientations to couple the interrogation signal to the device are less critical in interrogation by acoustic energy.

Figure 2B:
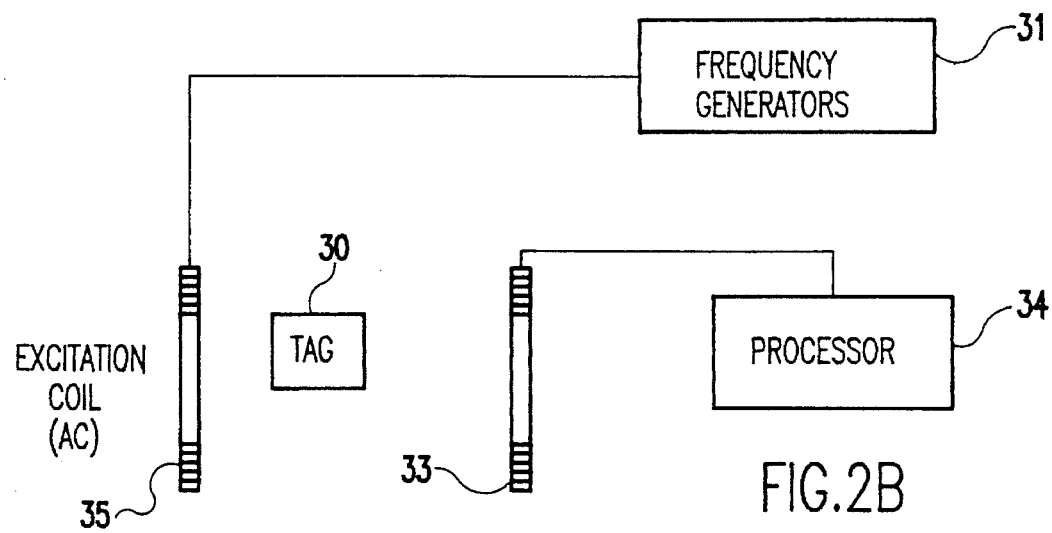
FIG. 2B illustrates a tag according to the present invention being driven by an AC magnetic field.

FIG. 2B illustrates a tag according to the present invention being driven by an AC magnetic field in which frequency generators 31 drive an AC magnetic excitation coil 35 for interrogating the tag 30 and for causing the array of active elements in tag 30 to oscillate at their predetermined resonant frequencies for detection by coil 33 and detection of the predetermined code of the tag. Other features of this system include providing a plurality of coils each having different orientations to minimize geometrical effects. This system is advantageous because of its integrated character (e.g., the entire system being magnetic).

Figure 2C:
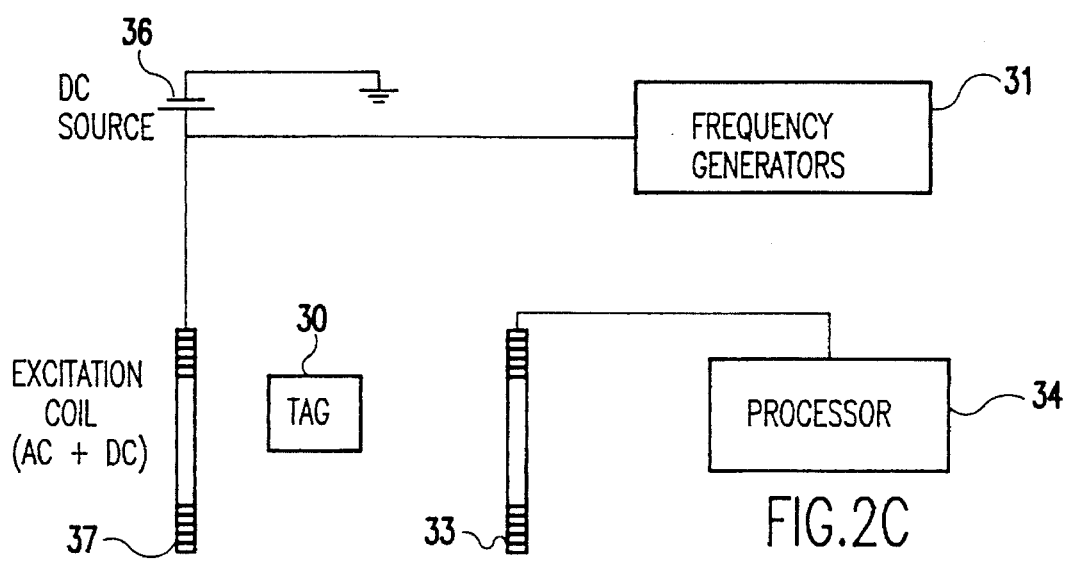
FIG. 2C illustrates a tag according to the invention being driven by a combination of AC and DC magnetic fields.

FIG. 2C illustrates a tag according to the invention being driven by a combination of AC and DC magnetic fields in which frequency generators 31 and a DC source 36 (e.g., a battery, etc.) drive an AC and DC coil 37. The AC and DC coil can be formed integrally or as separate components. With such a structure, the tag need not have a hard magnet built therein. In this system, frequency generators 31 and DC source 36 drive the AC and DC magnetic excitation coil 37 for interrogating the tag 30 and for causing the array of active elements in tag 30 to oscillate at their predetermined resonant frequencies. Such resonant frequencies are detected by coil 33 and the subsequent detection of the predetermined code of the tag is made after processing by the processor 34. Other features of this system include the ability to minimize the tag's size due to eliminating the hard magnet. This system is advantageous because of its simpler design.

While the invention has been described in terms of a preferred embodiment, those skilled in the art will recognize that the invention can be practiced with modification within the spirit and scope of the appended claims.

Having thus described our invention, what we claim as new and desire to secure by Letters Patent is as follows:

1. A system for remotely identifying an object, said system comprising:

apparatus for being attached to said object and for being remotely interrogated to give information regarding said object, said apparatus including:
        a substrate;
        a plurality of arms each fixed at an end thereof to said substrate to form respective cantilevers, each of said plurality of arms having respectively different physical dimensions, and each being coated with a soft magnetic coating to define a respective resonant frequency; and
        means for biasing said plurality of arms;

means for exciting said plurality of arms to cause at least some of said plurality of arms to generate harmonic magnetic oscillations defining a predetermined code associated with said object,
        said exciting means comprising at least one of means for producing resonant acoustic excitation and means for producing radio frequency magnetic excitation, wherein, in the presence of said acoustic external excitation, said at least some of said plurality of arms generate said oscillations, wherein, in the presence of said magnetic excitation, said at least some of said plurality of said arms generate said oscillation and wherein, in the presence of both of said magnetic external excitation and said acoustic external excitation, said at least some of said plurality of arms generate said oscillations; and means for remotely sensing said harmonic magnetic oscillations to detect said predetermined code.

2. A system according to claim 1, wherein at least one of said plurality of arms is disabled by rendering its coating nonmagnetic, such that said at least one of said plurality of arms is unaffected by said exciting means.

3. An apparatus according to claim 1, wherein said plurality of arms are coated with at least one of:

a bi-layer consisting of Ge and Co or an alloy of Co,
    a bi-layer consisting of Ge and Ni or an alloy of Ni,
    a layer of a soft magnetic alloy material, and
    a layer of an amorphous magnetic material.

4. A system according to claim 1, wherein said plurality of arms have different lengths from one another.

5. A system according to claim 1, wherein said biasing means comprises a magnetic yoke.

6. A system according to claim 1, wherein said substrate comprises a silicon material and wherein said plurality of arms are integrally formed with said substrate.

7. A system according to claim 1 wherein said biasing means comprises means for applying an inhomogeneous external magnetic field.

8. An apparatus for attachment to an object and for being remotely interrogated to give multibit information regarding said object, said apparatus comprising:

a substrate;
    a plurality of arms each fixed at an end thereof to said substrate each to form respective cantilevers, each of said plurality of arms being coated with a soft magnetic coating and at least some of said plurality of arms are being set with respectively different physical dimensions so that said arms each define a predetermined resonant frequency corresponding to a bit upon being subjected to excitation, to thereby provide said multibit information; and
    means for biasing said plurality of arms,
    wherein, upon reception of at least one of acoustic and magnetic external excitation, said at least some of said plurality of arms generate harmonic magnetic oscillations defining a predetermined code related to said information,
    wherein, in the presence of said acoustic external excitation, said at least some of said plurality of arms generate said oscillations, and wherein, in the presence of said magnetic excitation, said at least some of said plurality of said arms generate said oscillations, and
    wherein, in the presence of both of said magnetic external excitation and said acoustic external excitation, said at least some of said plurality of arms generate said oscillations.

9. An apparatus according to claim 8, wherein said plurality of arms are coated with at least one of:

a bi-layer consisting of Ge and Co or an alloy of Co,
    a bi-layer consisting of Ge and Ni or an alloy of Ni,
    a layer of a soft magnetic alloy material, and
    a layer of an amorphous magnetic material.

10. An apparatus according to claim 8, wherein said plurality of arms have different lengths and/or thicknesses from one another.

11. An apparatus according to claim 8, wherein said biasing means comprises a magnetic yoke.

12. An apparatus according to claim 8, wherein at least one of said plurality of arms is disabled by forming said at least one of said plurality of arms to be nonreactive to said external excitation, such that said at least one of said plurality of arms is unaffected by said external excitation.

13. An apparatus according to claim 8, wherein said plurality of arms are integrally formed with said substrate, said substrate comprising a silicon material.

14. An apparatus according to claim 8, wherein said plurality of arms are separately formed from said substrate and are mounted thereto.

15. An apparatus according to claim 8, wherein said biasing means comprises means for applying an inhomogeneous external magnetic field.

16. An apparatus according to claim 8, wherein said biasing means comprises means for applying an inhomogeneous external magnetic field and a magnetic yoke.

17. A method of remotely sensing an identifier coupled to an article, said method comprising the steps of:

providing said identifier for said article, said identifier containing predetermined information regarding said article, said identifier comprising a plurality of arms each fixed at an end thereof to a substrate to form respective cantilevers, and each having a soft magnetic coating thereon, such that at least some of said arms are dimensionally tuned to produce resonant frequencies that correspond to multiple bits of said predetermined information related to said article;

exciting said plurality of arms by at least one of acoustic excitation and magnetic excitation to cause said at least some of said plurality of arms to generate harmonic magnetic oscillations defining a predetermined code corresponding to said predetermined information having multiple bits, wherein, in the presence of said acoustic external excitation, said at least some of said plurality of arms generate said oscillations, wherein, in the presence of said magnetic excitation, said at least some of said plurality of said arms generate said oscillations, and wherein, in the presence of both of said magnetic external excitation and said acoustic external excitation, said at least some of said plurality of arms generate said oscillations; and detecting said harmonic magnetic oscillations to detect said predetermined code.

18. A method according to claim 17, further comprising a step of:

providing said plurality of arms to have different lengths and/or thicknesses.

19. A method according to claim 17, further comprising a step of:

disabling at least one of said plurality of arms by forming said at least one of said plurality of arms to be nonreactive to said one of said acoustic excitation and magnetic excitation, such that said at least one of said plurality of arms is unaffected by said step of exciting and is thus incapable of harmonic magnetic oscillations.

* * * * *